United States Patent
LeBaron

[11] 3,713,431
[45] Jan. 30, 1973

[54] DIAMOND TOOL
[75] Inventor: Chester A. LeBaron, Franklin Lakes, N.J.
[73] Assignee: Maurice S. Dessau Co., Inc.
[22] Filed: Aug. 30, 1971
[21] Appl. No.: 175,952

[52] U.S. Cl. .................................................. 125/39
[51] Int. Cl. .............................................. B28d 5/02
[58] Field of Search ............... 125/11 N, 11 R, 39

[56] References Cited

UNITED STATES PATENTS 2,845,922   8/1958   Kohlstrunk ......................... 125/39
2,400,368   5/1946   Palmer ............................. 125/11 R Primary Examiner—Harold D. Whitehead
Attorney—Harry B. Rook

[57] ABSTRACT

A diamond tool includes a tubular shank which has a cylindrical end portion, and a friction ring carrying a diamond having a cylindrical recess which freely receives said cylindrical end portion of the shank for rotation of the ring on the shank to turn the diamond from time-to-time, and there are radial openings in the shank containing balls which are pressed by a screw pressed pointed rod in the shank into snug but yieldable frictional contact with the wall of said recess to hold the ring in adjusted position.

3 Claims, 4 Drawing Figures

PATENTED JAN 30 1973
3,713,431
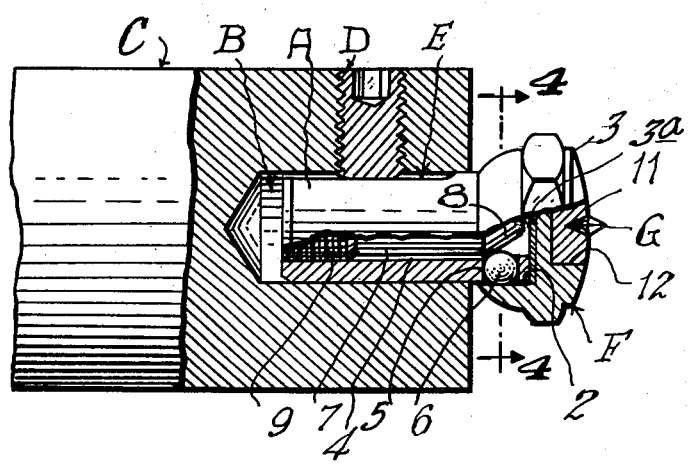
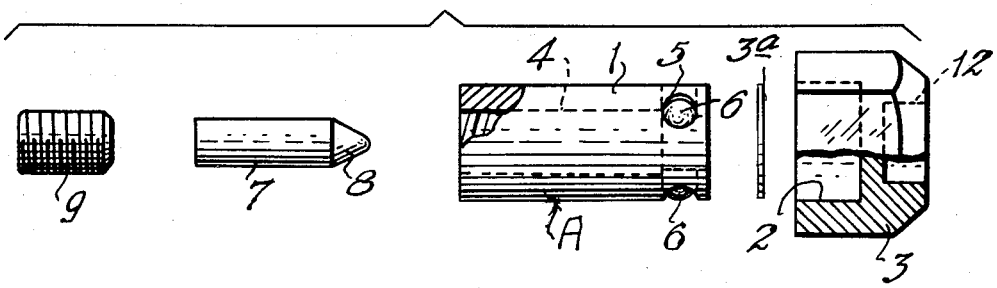
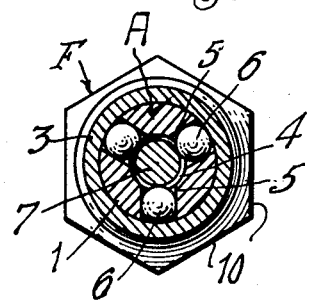
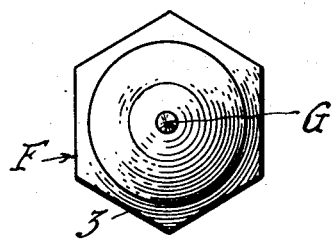
INVENTOR.
Chester A. LeBaron,
BY
*[signature]*
ATTORNEY

DIAMOND TOOL

BACKGROUND OF THE INVENTION

1. Field of the Invention

This invention relates to tools having diamond points to cut and true grinding wheels.

2. The Prior Art

Tools of this general character include a shank portion one end of which is adapted to be removably and rigidly secured in a shaft or other support while the other end has a diamond holder mounted thereon.

Generally the diamond holder is yieldingly, frictionally rotatable on the shank to allow the diamond to be turned from time-to-time so as to present a fresh portion of the diamond to the wheel being cut, and friction between the holder and adjacent parts is relied upon to releasably lock the diamond holder in adjusted positions.

In one tool the shank has a tapered portion at one end over which is rotatably fitted a diamond carrying friction ring which has radially disposed balls pressed into snug but yieldable frictional contact with said tapered portion by set screws exposed on the periphery of the ring and adjustable individually to hold the ring in adjusted position.

The prior art devices leave much to be desired in that the tightening of the balls on the tapered portion tend to cause jamming of the ring on the tapered portion, and adjusting of the screws individually is excessively time-consuming and it is difficult to obtain the same degree of frictional contact with each ball.

SUMMARY OF THE INVENTION

A primary object of the invention is to provide a diamond tool which overcomes the objections to and disadvantages of the prior tools, and which permits easy adjustment of the diamond holder on the shank and also provides easy and quick adjustment of the degree of frictional contact of the friction ring with the shank.

Another object is to provide such a tool wherein the shank is tubular and has a cylindrical end portion loosely disposed in a cylindrical recess in the friction ring, and said portion of the shank has radial holes in each of which is a ball, all of which balls are simultaneously pressed into contact with the inner wall of the recess in the friction ring by a single element, for example, a screw-propelled pointed rod in the shank to permit rotation of the ring but also provide sufficient friction to hold the ring in adjusted positions.

BRIEF DESCRIPTION OF THE DRAWINGS

FIG. 1 is a combined elevational and longitudinal vertical sectional view of a diamond tool embodying the invention, showing the tool secured in a suitable support which is illustrated partially in side elevation and partially in longitudinal vertical section;

FIG. 2 is an exploded view showing the parts of the tool in disassembled relation, the diamond being omitted and the friction ring being shown in condition before its application to the shank;

FIG. 3 is an end elevational view of the tool separated from the holder, and

FIG. 4 is a transverse vertical sectional view on the plane of the line 4—4 of FIG. 1.

DESCRIPTION OF THE PREFERRED EMBODIMENTS

Specifically describing the invention, the tool for dressing abrasive wheels comprises a generally cylindrical shank A preferably of hardened steel one end portion of which is adapted to be slidably assembled in a recess B in a support or shaft C, the shank being rigidly mounted in the support by a set screw D which bears upon a flat surface E on the shank.

The other end of the shank has rotatably mounted thereon a diamond holder F friction between which and the shank is relied upon to releasably lock the diamond holder in adjusted positions to allow the diamond G to be turned from time-to-time so as to present a fresh portion of the diamond to the wheel being cut.

As shown, the shank has a cylindrical end portion 1 loosely disposed in a cylindrical recess 2 in the diamond carrying a preferably brass friction ring 3 of the diamond holder F. A metal wear disc 3a is interposed between the end of the shank and the end wall of the recess 2 to prevent burring of the parts. The shank 1 is tubular and has a coaxial longitudinal opening 4 that extends through both ends of the shank, and a cylindrical portion 1 of the shank has a plurality of radial holes 5 extending from the longitudinal hole 4 outwardly through the periphery of the shank as best shown in FIG. 4. In each of the holes is a ball 6 and in accordance with the invention, the balls 6 are pressed into frictional contact with the cylindrical wall of the recess 2 to provide the frictional resistance to rotation of the friction ring 3 so as to hold the friction ring in adjusted positions. The balls are held in frictional contact with the wall of the recess 2 by suitable means, preferably a rod 7 slidable in the hole in the shank and having a pointed end 8 which is forced between the balls by a set screw 9 threaded in the longitudinal opening 4 in the shank. By simple adjustment of the set screw 9, the point 8 of the rod 7 may be caused to exert more or less pressure on the balls 6 so as to provide frictional contact of the balls with the wall of the recess 2 in the friction ring sufficient to permit rotation of the friction ring but also firmly hold the friction ring in adjusted positions.

I claim:

1. A diamond tool comprising a tubular shank having central longitudinal opening and a cylindrical end portion having radial holes leading from said longitudinal opening outwardly through the peripheral surface, a diamond-carrying friction ring having a recess with a cylindrical wall in which said cylindrical end portion of the shank is received for rotation of said ring on the shank, a ball in each of said radial holes and means in said longitudinal opening of the shank for pressing said balls uniformly outwardly into frictional contact with the cylindrical wall of said recess.

2. A diamond tool as defined in claim 1 wherein said means comprises a rod slidable in said longitudinal opening and having a pointed end abutting said balls, and means for forcing said rod to hold said pointed end in engagement with said balls.

3. A diamond tool as defined in claim 2 wherein the last-named means is a screw threaded in said longitudinal opening and abutting said rod.

* * * * *